United States Patent
Cheung et al.

(10) Patent No.: US 7,292,830 B1
(45) Date of Patent: Nov. 6, 2007

(54) RECEIVER GAIN MANAGEMENT

(75) Inventors: Bing Leung Cheung, Calgary (CA); Roman Nemish, Calgary (CA)

(73) Assignee: Nortel Networks Limited, St. Laurent (CA)

(*) Notice: Subject to any disclaimer, the term of this patent is extended or adjusted under 35 U.S.C. 154(b) by 214 days.

(21) Appl. No.: 10/815,261

(22) Filed: Mar. 31, 2004

(51) Int. Cl.
H04B 17/02 (2006.01)
H04B 17/00 (2006.01)
H04B 1/06 (2006.01)
H04B 7/00 (2006.01)
H04L 27/08 (2006.01)

(52) U.S. Cl. .................. 455/136; 455/266; 455/226.1; 375/345

(58) Field of Classification Search ............. 455/135, 455/136, 138, 226.1, 232.1, 245.1, 247.1, 455/266, 254, 132, 133; 375/345, 346
See application file for complete search history.

(56) References Cited

U.S. PATENT DOCUMENTS

| | | | | |
|---|---|---|---|---|
| 5,412,690 | A * | 5/1995 | Kotzin et al. ............... | 375/256 |
| 5,724,652 | A * | 3/1998 | Graham et al. ........... | 455/234.1 |
| 5,818,827 | A * | 10/1998 | Usui et al. .................. | 370/344 |
| 6,285,863 | B1 * | 9/2001 | Zhang ...................... | 455/234.1 |
| 6,404,830 | B2 * | 6/2002 | Wiese et al. ................ | 375/346 |
| 6,426,983 | B1 * | 7/2002 | Rakib et al. ................ | 375/346 |
| 6,480,528 | B1 * | 11/2002 | Patel et al. .................. | 375/148 |
| 6,614,806 | B1 * | 9/2003 | Nanni ......................... | 370/468 |
| 6,738,367 | B1 * | 5/2004 | Seo ............................. | 370/342 |
| 6,775,336 | B1 * | 8/2004 | Takaki ........................ | 375/345 |
| 6,978,125 | B2 * | 12/2005 | Lindell et al. ........... | 455/183.1 |
| 2003/0021367 | A1 * | 1/2003 | Smith ......................... | 375/346 |
| 2003/0073423 | A1 * | 4/2003 | Cho ............................ | 455/324 |
| 2003/0087622 | A1 * | 5/2003 | Jayaraman et al. ......... | 455/307 |
| 2004/0151264 | A1 * | 8/2004 | Montojo et al. ............ | 375/345 |
| 2004/0176055 | A1 * | 9/2004 | Vepsalainen et al. ....... | 455/130 |
| 2004/0214540 | A1 * | 10/2004 | Dockemeyer et al. ... | 455/182.1 |
| 2005/0026564 | A1 * | 2/2005 | Haub et al. ............... | 455/67.11 |

OTHER PUBLICATIONS

"Narrowband," TRA, copyright 1998.*

* cited by examiner

Primary Examiner—Nay Maung
Assistant Examiner—Andrew Wendell
(74) Attorney, Agent, or Firm—Schwegman, Lundberg & Woessner, P.A.

(57) ABSTRACT

Noise floor searching is performed for a cellular base station to increase accuracy of receiver gain estimates. This allows adjustment of gain in a radio module to account for gain in front-end devices, and achieve a desired overall receiver target gain. The gain of the RF front-end devices is estimated based on the difference between measured Rx noise power at a receive port of the radio module and the noise floor of the radio module. In one embodiment, frequency sweeping across a receive band using a narrowband filter is done to search for minimum noise power. Interference detection may also be employed to increase awareness of any interfering signals that are presented at a configured channel. It is determined whether the interference is wideband or narrowband.

7 Claims, 6 Drawing Sheets

RECEIVER GAIN MANAGEMENT

FIELD OF THE INVENTION

The present invention relates to receiver gain management, and in particular to noise detection for setting receiver gain and detecting interference.

BACKGROUND OF THE INVENTION

When a cellular base station is newly deployed, the receiver gain is set to a desired level to achieve a desired sensitivity and allow various HW components to operate in the linear region. Due to the increase in popularity of wireless communications, more and more base stations are being deployed to increase capacity in cellular systems. This results in increased co-channel interference. The presence of interference can result in incorrect setting of the receiver gain, which affects the receiver sensitivity.

Prior receiver gain calibration methods identify noise power based on a minimum received power at a configured channel for a predetermined amount of time, such as the first 24 hours after a system is deployed. If an interfering signal is present for longer than 24 hours, the gain of RF front-end devices is estimated inaccurately. If the interfering signal disappears after the first 24 hours, incorrect received powers are reported. In either event, the gain may be incorrectly set.

SUMMARY OF THE INVENTION

Noise floor searching is performed for a cellular base station to increase the accuracy of pre radio module gain estimates. This allows adjustment of gain in a radio module to account for gain in front-end devices, and achieve a desired overall receiver target gain. The gain of the RF front-end devices is estimated based on the difference between measured Rx noise power at a receive port of the radio module and the noise floor of the radio module. In one embodiment, frequency sweeping across a receive band using a narrowband filter is done to search for minimum noise power.

Interference detection may also be employed to increase awareness of any interfering signals that are presented at a configured channel. The interference detection algorithm is able to identify whether the interference is wideband or narrowband. Narrowband types of interference may indicate the presence of an intermodulation tone or other type of modulated signal, such as an AMPS (Advanced Mobile Phone System) signal. Wideband type interference may indicate the presence of CDMA (Code Division Multiple Access) signals or wideband CDMA signals. This type of information aids in identification and elimination of the interference.

DETAILED DESCRIPTION OF THE INVENTION

In the following description, reference is made to the accompanying drawings that form a part hereof, and in which is shown by way of illustration specific embodiments in which the invention may be practiced. These embodiments are described in sufficient detail to enable those skilled in the art to practice the invention, and it is to be understood that other embodiments may be utilized and that structural, logical and electrical changes may be made without departing from the scope of the present invention. The following description is, therefore, not to be taken in a limited sense, and the scope of the present invention is defined by the appended claims.

The functions or algorithms described herein are implemented in software or a combination of software and human implemented procedures in one embodiment. The software comprises computer executable instructions stored on computer readable media such as memory or other type of storage devices. The term "computer readable media" is also used to represent carrier waves on which the software is transmitted. Further, such functions correspond to modules, which are software, hardware, firmware or any combination thereof. Multiple functions are performed in one or more modules as desired, and the embodiments described are merely examples. The software is executed on a digital signal processor, ASIC (Application Specific Integrated Circuit), microprocessor, or other type of processor operating on a computer system, such as a personal computer, server or other computer system.

Figure 1:
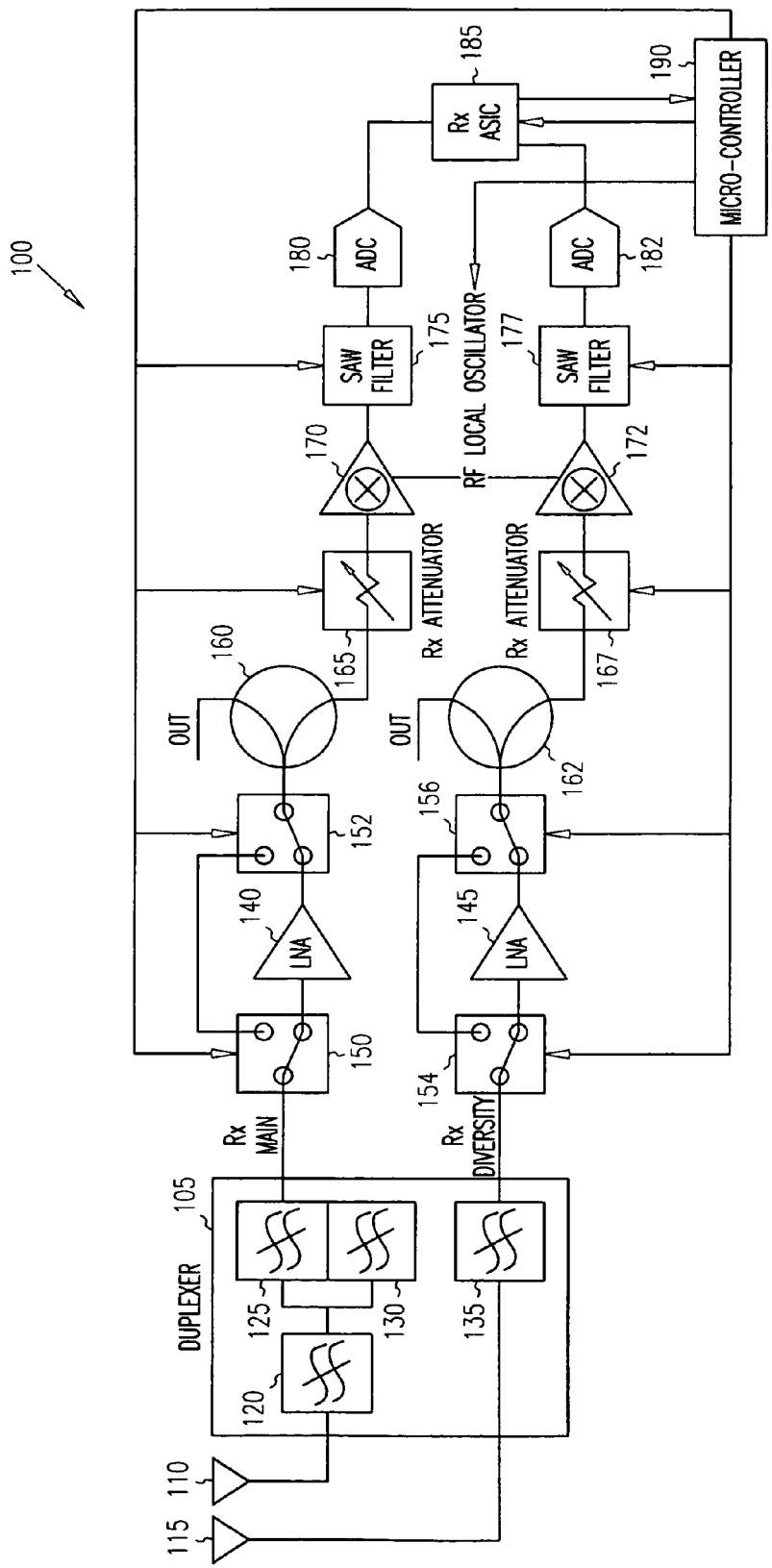
FIG. 1 is a block diagram of a radio module for a cellular base station according to an embodiment of the invention.

FIG. 1 shows a partial block diagram of a radio module for a base station, illustrating a receiver indicated generally at 100. Receiver 100 has a duplexer 105 coupled to a pair of antennas 110 and 115 for receive diversity. Duplexer 105 comprises bandpass filters 120, 125, 130 and 135, which allow only a selected frequency band of RF (Radio Frequency) signals to be transmitted on a transmit path, and a selected frequency band of RF signals to be received on a receive path. Received signals are filtered, and selectively coupled to low noise amplifiers (LNAs) 140, 145 by sets of switches 150, 152, 154 and 156.

The received signals are then optionally coupled to splitters 160 and 162 to provide optional output signals on one path and couple the signals to Rx (receive) attenuators 165, 167 on the other path. The Rx attenuators are coupled to respective local oscillators 170, 172, which are then coupled to respective programmable surface acoustic wave (SAW) filters 175, 177 for filtering received radio frequency signals. Each SAW filter 175, 177 is a bandpass filter that has low phase distortion and is operative to limit out-of-band signals. The received signals are then coupled to analog to digital converters (ADCs) 180 and 182, which are coupled to an Rx ASIC 185.

ASIC 185 is referred to as a channelizer that performs digital channel selection consisting of ADC interfacing, channel tuning, channel selection (filtering), automatic gain control, power measurement, and interfacing to a micro-controller 190 of the radio module.

Micro-controller 190 can be used to set the switches 150, 152, 154 and 156 to either bypass or switch-in the low noise amplifiers 140, 145. In the embodiment shown, both receive main and diversity paths are illustrated. The low noise amplifiers have a gain of 34 dB in one embodiment. Other gains may be utilized. The micro-controller 190 is also used to control the attenuation of the Rx attenuators, which in one embodiment has a range of from 0 to 31 dB. In conjunction with the optional use of the low noise amplifiers, the gain is variable between approximately 34 dB and −31 dB. It is also used to program the Rx local oscillator and modify the bandwidth and frequency characteristics of filters for signal processing.

In one embodiment, a base station comprises three or more radio modules, each having a receiver 100. Each radio module transmits and receives signals for each sector of a cell site. In future embodiment, one radio module may transmit and receive signals for all the sectors of a cell site. In operation, each radio module's SAW filter is tuned to a channel, such as a 1.23 MHz wide CDMA (code division multiple access) channel. Interference detection and noise floor searching may be independently used in a process of calibrating receiver gain for each radio module. In some embodiments, interference detection is performed after noise floor searching.

Figure 2:
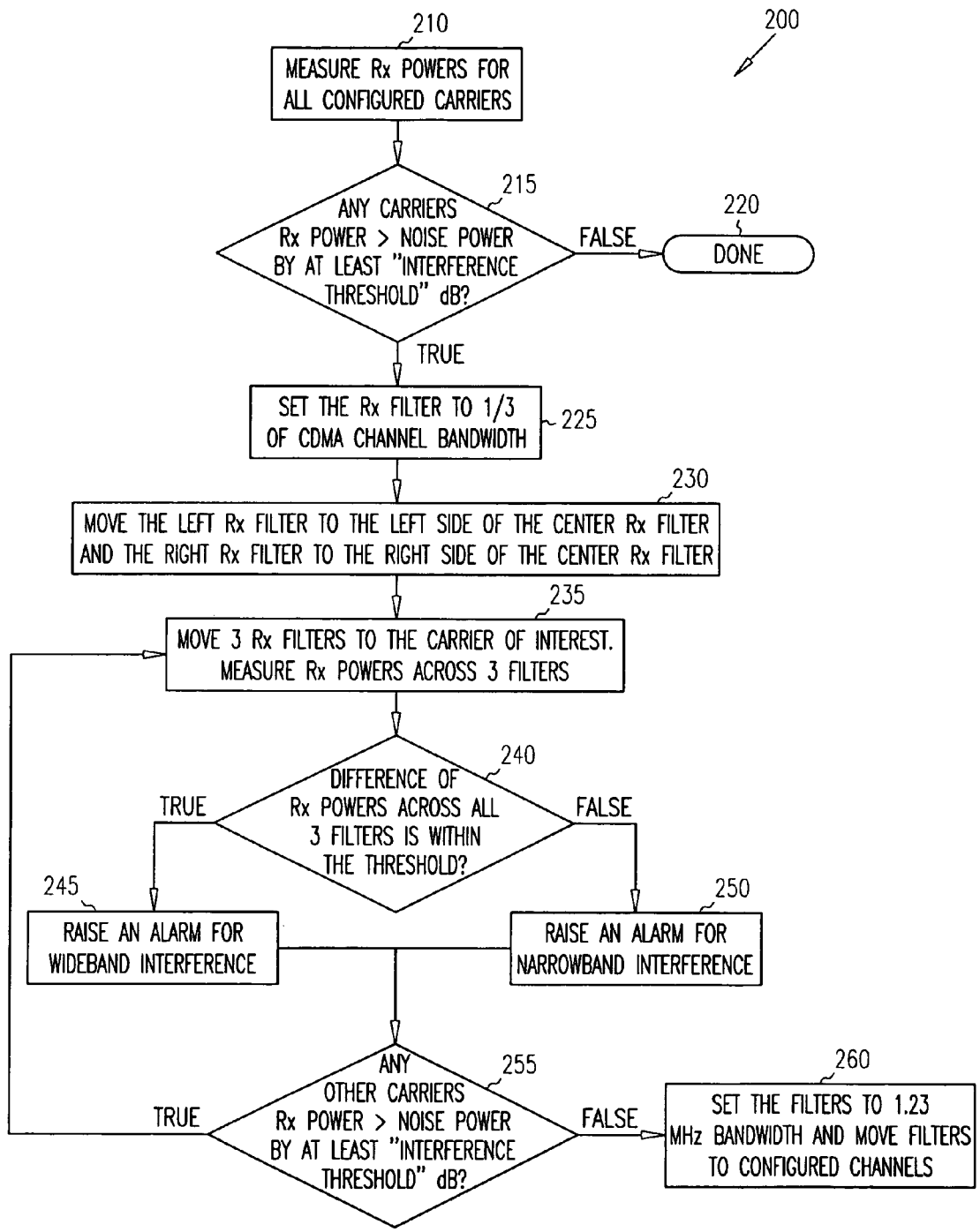
FIG. 2 is a flow chart of interference searching according to an embodiment of the invention.
Figure 3A:
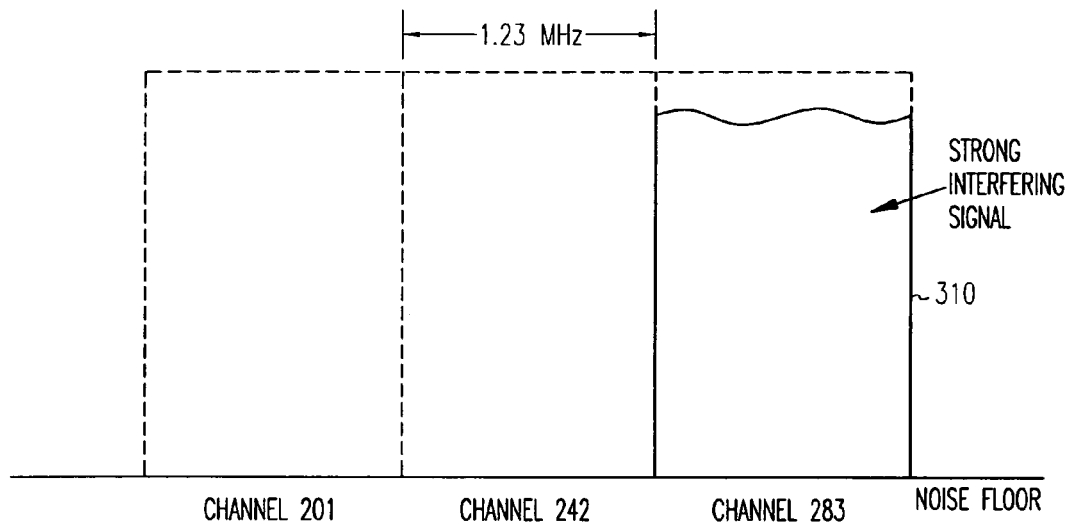
FIGS. 3A, 3B, 3C and 3D illustrate programming bandwidth in association with interference searching according to an embodiment of the invention.

Interference detection 200 is performed in one embodiment in accordance with the flowchart of FIG. 2 and as illustrated in the frequency diagrams of FIGS. 3A, 3B, 3C and 3D. At 210, the Rx powers for all configured carriers is measured. The configured carriers correspond to the CDMA channels in one embodiment. There may be one or more such channels, and three are shown in this embodiment as also indicated in FIG. 3A. A strong interference signal is shown at 310 on a channel 283.

At 215, if Rx powers of all carriers are not greater than the measured noise power by at least an interference threshold, such as 10 dB in one embodiment, interference detection is done at 220. However, if any carrier's Rx power is greater than the measured noise power by at least an interference threshold, further interference detection is performed. The interference threshold may be varied in different embodiments, depending on the many different system and environmental parameters, as will be apparent to one of average skill in the art.

Figure 3B:
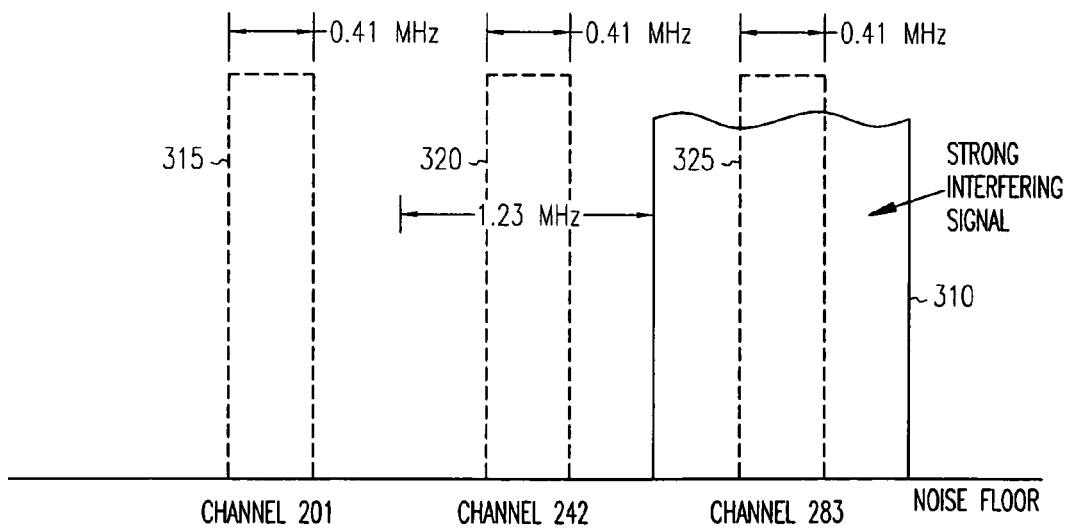
Figure 3C:
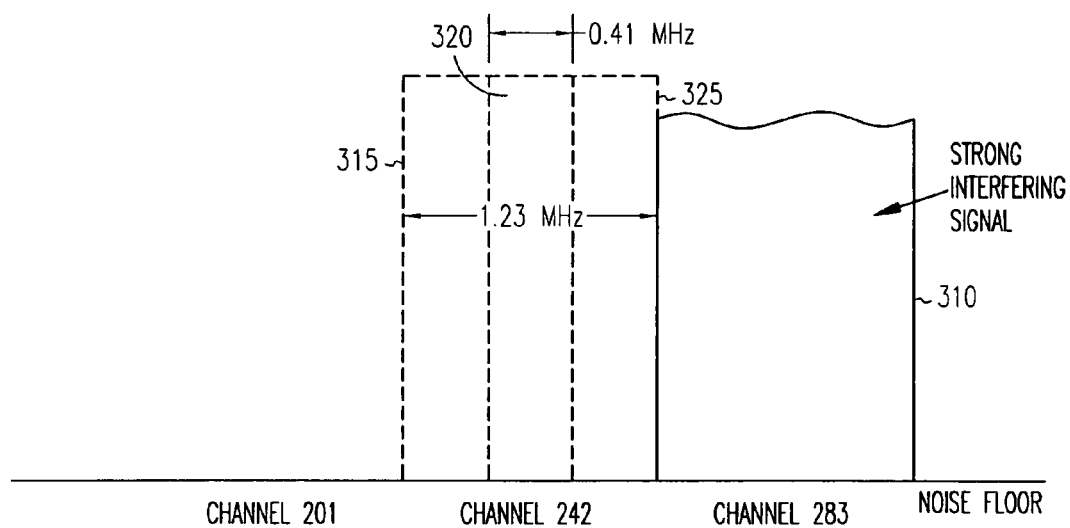

When decision block 215 is true, each of three Rx filters represented at 315, 320 and 325 is set to $\frac{1}{3}^{rd}$ (0.41 MHz) of the CDMA channel bandwidth as shown in FIG. 3B. At 230, the left Rx filter 315 is moved to the left side of the center Rx filter 320, and the right Rx filter 325 is moved to the right side of the center Rx filter 320, such that the combination of the Rx filters is one channel wide as illustrated in FIG. 3C. In other words, the filters are merged to occupy a single channel. In further embodiments, if a different number of filters are available, any desired number of Rx filters may be merged in a similar manner.

Figure 3D:
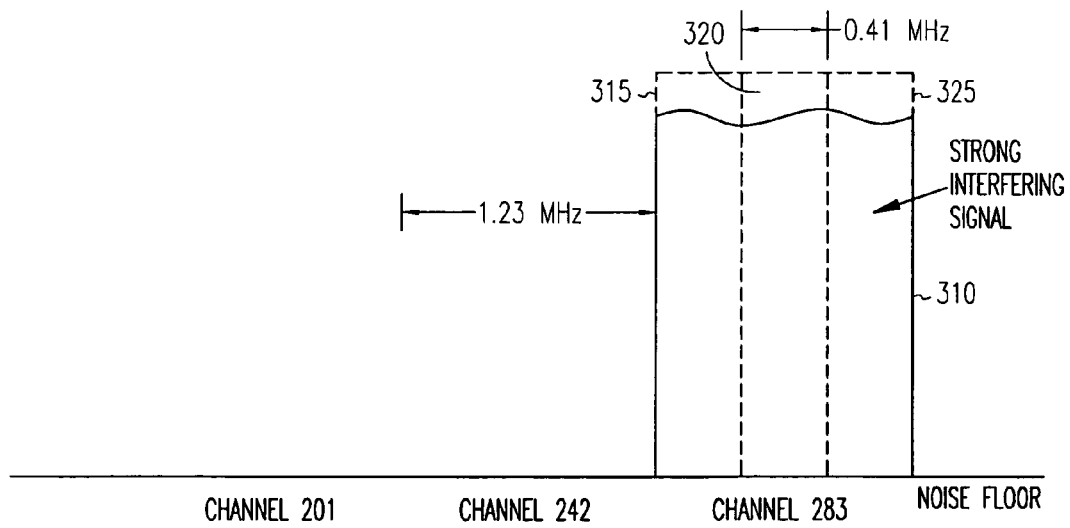

At 335, the merged Rx filters are moved to a carrier of interest, and the Rx powers across the filters are measured. In FIG. 3D, the carrier of interest is channel 283, which has the strong interfering signals 310. A decision block 240, the difference of Rx powers across the three filters is compared to a threshold, such as 5 dB in one embodiment. If within the threshold, an alarm for wideband interference is raised at 245. If outside the threshold, an alarm for narrowband interference is raised at 250. At 255, a check is made to determine if any other carrier's Rx power is greater than the noise power by at least the interference threshold. If true, the process returns to block 235 to move the filters to the carrier of interest and recheck for narrowband or wideband interference. Each of the carriers may be checked in this manner. In some embodiments, interference detection may be performed outside the configured channels.

If the determination at 255 was false, interference checking is complete, and the filters are reset to the proper bandwidth and configured channels for normal operation of the base station. These checks help in identifying potential sources of interference, which may then be removed. Narrowband types of interference may indicate the presence of an intermodulation tone or other type of modulated signal, such as an AMPS signal. Wideband type interference may indicate the presence of CDMA signals or wideband CDMA signals. This type of information aids in identification and elimination of the interference.

Figure 4:
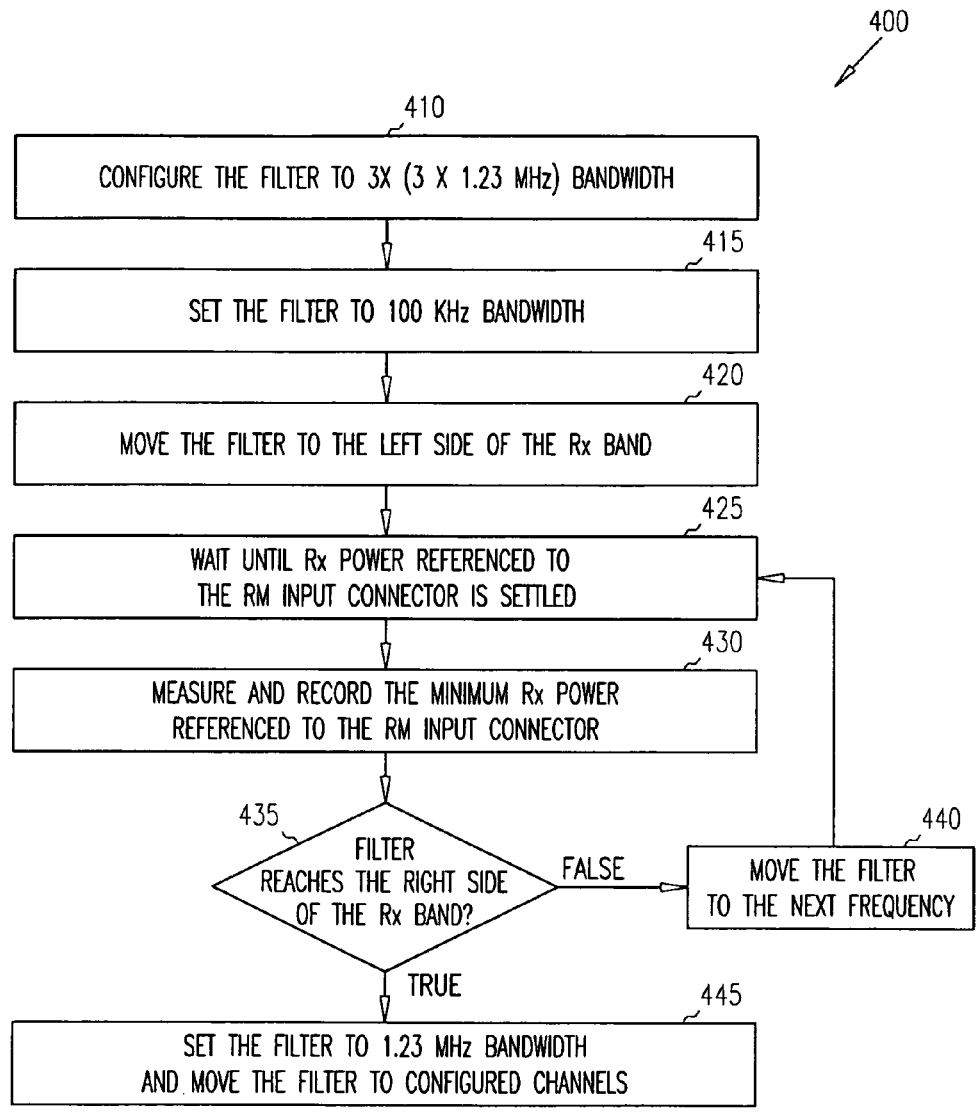
FIG. 4 is a flow chart of noise floor searching according to an embodiment of the invention.
Figure 5A:
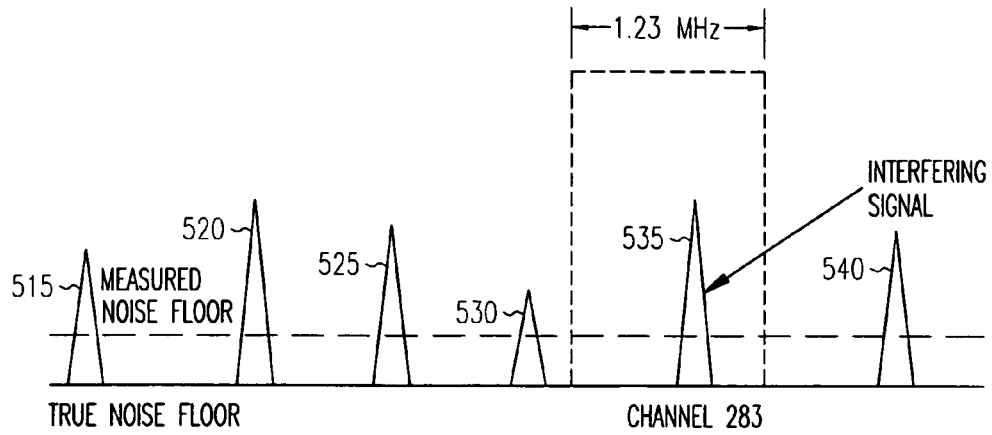
FIGS. 5A, 5B, and 5C illustrate programming bandwidth in association with noise flow searching according to an embodiment of the invention.
Figure 5B:
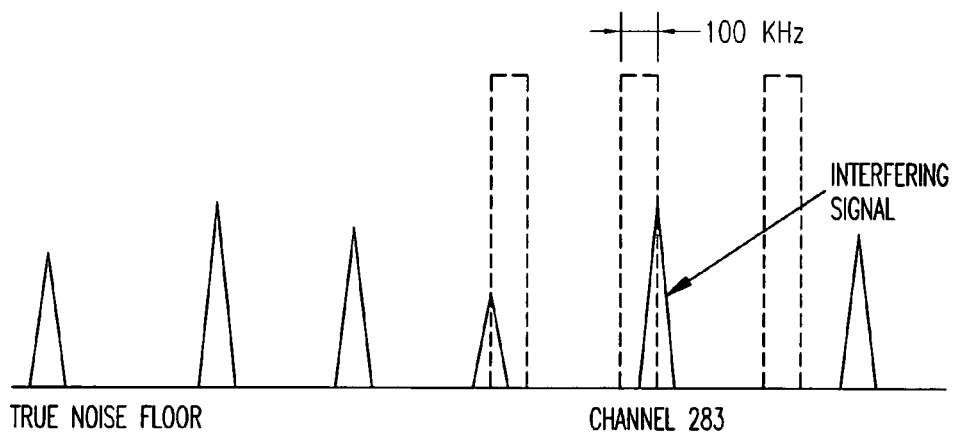
Figure 5C:
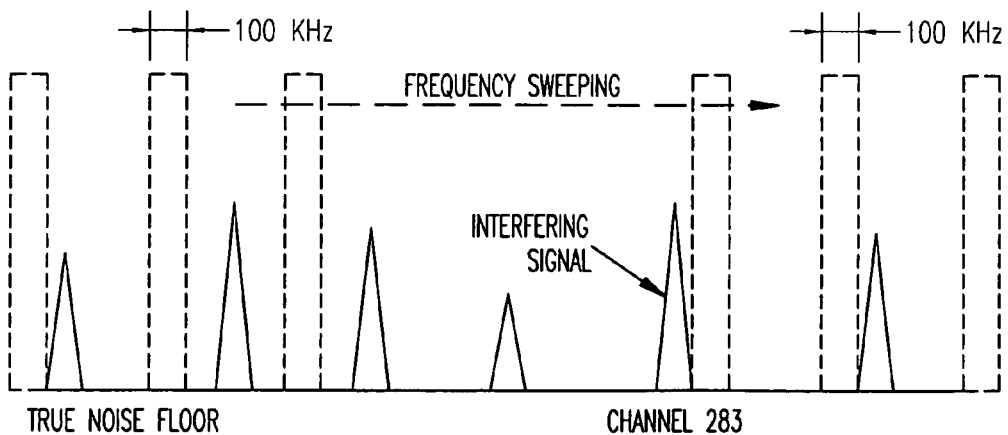

Noise floor searching is performed in accordance with the flowchart 400 of FIG. 4, as illustrated with frequency charts in FIGS. 5A, 5B and 5C. FIG. 5A illustrates a filter 510 configured for a full channel. Several noise spikes are indicated at 515, 520, 525, 530, 535 and 540. Noise spike 535 falls within the channel for which filter 510 is configured. A configuration mode is entered at 410 by configuring the filter to a three carrier mode which is three times the bandwidth of the channels as seen in FIG. 5B. At 415, the filter bandwidth is set to 100 kHz, or some other selected value for sampling power levels. At 420, the filter is moved to the left side of the Rx band as illustrated in FIG. 5C. The power referenced to the radio module receive input port is allowed to settle. This takes approximately three seconds in one embodiment. Once settled, the power is measured and recorded at 430.

If the filter has not reached the right side of the Rx band as indicated at 435, the filter is moved to the next frequency at 440. The number of moves is dependent on the time allowed for configuration. In some embodiments, 5 to 10 moves are used. As each one takes approximately three seconds in one embodiment, the configuration can be accomplished in under a minute. The settle time may vary with different embodiments to be significantly less or more than three seconds. Further, the number of moves may also be significantly varied. The actually number of moves may depend on the bandwidth of Rx band class and the types of air interface. In one embodiment, the bandwidth of the Rx band class is approximately 25 MHz for band class 0 of the CDMA air interface. The minimum received power corresponding to the noise floor is recorded at the end of the sweep.

The filter used during this sweep across the Rx band is a narrowband filter. The use of such a narrowband filter minimizes the chance of receiving interfering signals. The number of moves, and width of the filter can be modified to further minimize such chances of receiving interfering signals so the true noise floor has a higher probability of being detected.

The amount of gain provided by any RF front-end devices in front of the radio module is calculated as the noise floor within the bandwidth of the configured channel measured across the Rx band—(the theoretical thermal noise across the bandwidth of the configured channel+a noise figure for the radio module). In one embodiment, the bandwidth of the configured channel is 1.23 MHz. The theoretical thermal noise is well known to those of skill in the art. The noise figure of the radio module is also known. Based on this estimated pre-radio module gain, a decision is made in the radio module whether to switch-in, or bypass a low noise amplifier inside the radio module. If there is minimal pre-radio module gain, more receiver gain is needed to amplify received signals, and the low noise amplifier is switched in. It provides sufficient amplification to amplify the received signals by approximately 34 dB in one embodiment. Other gains may also be employed depending on embodiment. If there is large pre-radio module gain, more receiver attenuation is needed to attenuate received signals, and the low noise amplifier is bypassed and the receiver attenuator value is increased. In one embodiment, with bypassing the low noise amplifier and adjusting the receiver attenuator value, the radio module exhibits between 0 and 31 dB loss.

CONCLUSION

Gain of RF front-end devices is estimated based on a difference between measured Rx noise power at a receive port of a radio module and the noise floor of the radio module. To make sure that the measured Rx power is the noise power, a noise floor searching algorithm sweeps the frequencies across the receive band using a narrowband filter to search for the minimum Rx power. Using a narrowband filter reduces the chance to receive any interfering signals that can cause an incorrect estimation of the gain of front-end devices.

Interference detection uses multiple narrowband filters and power detectors to distinguish between narrowband and wideband interfering signals at configured channels. It first sets the receive filter bandwidth to be one-third of the bandwidth of a CDMA channel and then tunes three narrowband filters to the channel of interest. After that, each per-carrier power detector measures the received power which corresponds to one third of the total power received by the CDMA channel. For a narrowband type of interference which has a bandwidth less than that of a CDMA signal, the received powers measured by the three power detectors are different. A wideband interfering signal whose bandwidth is equal to or larger than the bandwidth of a CDMA signal should give very similar received powers for all three power detectors.

Radio modules implementing other types of channels and communication protocols may also utilize aspects of the present invention. While receive diversity is shown in the drawings, they need not be employed. The gain of the radio module may be adjusted in different ways. A single variable gain amplifier or other gain-modifying device in further embodiments may replace the use of a low noise amplifier and attenuator.

The invention claimed is:

1. A method of detecting interference, the method comprising:
   setting a bandwidth for multiple receiver filters to a portion of a channel bandwidth that is a function of the number of such receiver filters;
   merging the receiver filters to significantly cover the bandwidth of a channel;
   moving the merged receiver filters to selected channels to identify whether interference is narrowband or wideband; and
   increasing the receiver attenuation to protect the receiver from operating in the non-linear region and prevent an ADC (analog to digital converter) from saturation when a strong interfering signal is present.

2. The method of claim 1 wherein N received filters are used, and each covers approximately $1/N^{th}$ of the bandwidth of the channel, where N can be any integer number.

3. The method of claim 1 wherein the channel is a CDMA channel having a bandwidth of approximately 1.23 MHz.

4. The method of claim 1 and further comprising measuring received power through each filter at the selected channels.

5. The method of claim 4 wherein the interference is identified as narrowband if the difference of received power across all filters is substantially large at a selected channel.

6. The method of claim 4 wherein the interference is identified as wideband if the difference of received power across all filters is small at a selected channel.

7. A micro-controller comprising:
   means for setting a bandwidth for multiple receiver filters to a portion of a channel bandwidth that is a function of the number of such receiver filters;
   means for merging the receiver filters to significantly cover the bandwidth of a channel; and
   means for moving the merged receiver filters to selected channels to identify whether interference is narrowband or wideband.

* * * * *